United States Patent
Engel et al.

(10) Patent No.: US 10,434,727 B2
(45) Date of Patent: *Oct. 8, 2019

(54) APPARATUS AND METHOD FOR PRODUCING A FIBER COMPOSITE COMPONENT

(71) Applicant: AIRBUS DEFENCE AND SPACE GMBH, Taufkirchen (DE)

(72) Inventors: Franz Engel, Munich (DE); Christian Weimer, Munich (DE); Tilman Orth, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 222 days.

This patent is subject to a terminal disclaimer.

(21) Appl. No.: 15/359,038

(22) Filed: Nov. 22, 2016

(65) Prior Publication Data

US 2017/0144387 A1    May 25, 2017

(30) Foreign Application Priority Data

Nov. 24, 2015 (EP) .................................. 15196015

(51) Int. Cl.
*B29C 70/38* (2006.01)
*B29C 70/86* (2006.01)

(52) U.S. Cl.
CPC ............ *B29C 70/382* (2013.01); *B29C 70/38* (2013.01); *B29C 70/86* (2013.01)

(58) Field of Classification Search
CPC .............................. B29C 70/382; B29C 70/38
See application file for complete search history.

(56) References Cited

U.S. PATENT DOCUMENTS

| 4,588,466 A | 5/1986 | Eaton |
| 6,073,670 A * | 6/2000 | Koury ..................... B29C 70/16 156/425 |
| 7,282,107 B2 * | 10/2007 | Johnson .................. B29C 53/70 156/169 |
| 8,394,222 B2 * | 3/2013 | Rettig .................... B29C 53/588 156/169 |
| 9,375,907 B2 | 6/2016 | Boge et al. |
| 9,789,609 B2 | 10/2017 | Crothers |

(Continued)

FOREIGN PATENT DOCUMENTS

| DE | 10 2010 039955 A1 | 3/2012 |
| DE | 20 2011 110 519 U1 | 7/2014 |

OTHER PUBLICATIONS

German Search Report for Application No. 15196015 dated May 10, 2016.

(Continued)

*Primary Examiner* — Jeffry H Aftergut
(74) *Attorney, Agent, or Firm* — Jenkins, Wilson, Taylor & Hunt, P.A.

(57) ABSTRACT

An apparatus for producing a fiber composite component. The apparatus includes a shaping tool and a plurality of laying units which are mechanically independent of one another and are each configured to lay a fiber material on the shaping tool, wherein the laying units each include a control device which is configured to actuate each laying unit to automatically interact with at least one other laying unit to lay a predetermined fiber arrangement together.

11 Claims, 4 Drawing Sheets

(56) References Cited

U.S. PATENT DOCUMENTS

| | | |
|---|---|---|
| 2005/0236735 A1 | 10/2005 | Oldani et al. |
| 2006/0260751 A1* | 11/2006 | Lauder ................. B29C 70/388 156/382 |
| 2010/0193103 A1* | 8/2010 | McCowin ............. B29C 70/388 156/60 |
| 2013/0158697 A1 | 6/2013 | Stone et al. |
| 2015/0224941 A1 | 8/2015 | Bernstein et al. |
| 2017/0144384 A1 | 5/2017 | Engel et al. |

OTHER PUBLICATIONS

German Search Report for Application No. 15196004 dated Mar. 18, 2016.
Non-Final Office Action for U.S. Appl. No. 15/359,077 dated Nov. 14, 2018.

* cited by examiner

APPARATUS AND METHOD FOR PRODUCING A FIBER COMPOSITE COMPONENT

CROSS-REFERENCE TO RELATED APPLICATION

This application claims priority to European Patent Application EP 15 196 015.0 filed Nov. 24, 2015, the entire disclosure of which is incorporated by reference herein.

TECHNICAL FIELD

The present disclosure relates to an apparatus and to a method for producing a fiber composite component.

BACKGROUND

Although the present disclosure can be applied to any fiber composite materials and any components, the present disclosure and the problem addressed thereby will be described in greater detail with reference to carbon-fiber-reinforced plastics materials (CFRP) and large components, for example fuselage parts of an aircraft or spacecraft.

Sometimes, large CFRP components are mostly produced using what is known as automated fiber placement (AFP) technology. For this purpose, system technology having very large dimensions is required. The technology is mostly a laying robot which runs in a suspended manner on a gantry, what is known as a fiber-placement head or tape-laying head, which lays fibers on a shaping tool, for example the negative form of a fuselage portion of an aircraft or spacecraft.

One approach to a fiber-laying apparatus which differs from such installations is described in DE 20 2011 110 519 U1. In this case, a rail system is provided, comprising a plurality of rails and a plurality of laying robots which can be moved along the rails on the rail system. The laying robots and the rail system are controlled by a central master computer.

SUMMARY

One of the ideas of the present disclosure is to provide an improved apparatus and an improved method for producing a fiber composite component.

According to some aspects, the following is provided:

An apparatus for producing a fiber composite component, comprising a shaping tool and a plurality of laying units which are mechanically independent of one another and which are each configured to lay a fiber material on the shaping tool, wherein the laying units each comprise a control device which is configured to actuate the particular laying unit to automatically interact with at least one other laying unit in order to lay a predetermined fiber arrangement together.

A method for producing a fiber composite component, in particular by an apparatus according to the disclosure herein, comprising the following method steps: providing a shaping tool and a plurality of laying units which are mechanically independent of one another and which are configured to lay a fiber material on the shaping tool; and laying the fiber material on the shaping tool together by the plurality of laying units which are mechanically independent of one another in a predetermined fiber arrangement, wherein the laying units each comprise a control device, by which the particular laying unit is actuated to automatically interact with at least one other laying unit in order to lay the predetermined fiber arrangement together.

The concept on which the present disclosure is based consists in or involves providing a plurality of laying units, wherein each of the laying units comprises a control device belonging thereto, and wherein the laying units are configured to coordinate or match the fiber deposits with/to one another. Thus, laying units which are at least partly autonomous are provided, which are intended to automatically lay the fiber material in a flexible manner.

Advantageously therefore, the conventionally very large and cost-intensive AFP installations are replaced with a plurality of laying units which can be used in an economical and flexible manner. This decreases the costs of investing in the system technology and makes more potential fields of application possible.

Furthermore, no guide rails or other configurations of guide devices are required, since the laying units are capable, due to each having a control device belonging thereto, of moving without a guide in a manner which is coordinated with the other laying units.

Furthermore, due to the high flexibility of the laying units, complex structures, for example bionic structures, and/or complex components can be reproduced.

Moreover, with respect to conventional AFP installations, the failure safety is significantly increased, since the plurality of laying units can be used at the same time and, in the event of failure of an individual laying unit, the remaining laying units still continue to operate and can replace the function of the failed laying unit.

Particularly advantageously, the laying units which can be controlled by the control device belonging thereto and which are mechanically independent of one another further make it possible to produce components of any size. In this case, the system technology in no way limits the component size. Merely a corresponding shaping tool is required.

Laying units which are mechanically independent of one another are to be understood to mean laying units which do not place any mechanical constraints on one another.

Actuating to automatically interact with at least one other laying unit to lay a predetermined fiber arrangement together is to be understood to mean that the laying units coordinate with one another, by the control devices thereof, in order to produce the predetermined fiber arrangement. The control devices of the individual laying units are in particular connected to one another for communication for this purpose.

Laying fiber material can be carried out with or without pretensioning the fiber material. Furthermore, the laying process can consist of or comprise applying the fiber material to a surface of the tool or winding or braiding the material around a shaping tool (in this case a core).

According to some developments, the laying units are each configured to move autonomously on an associated running surface. In particular, the laying units each comprise a sensor system and drive device which are configured for autonomous movement. The control device controls the drive device in order to produce the predetermined fiber arrangement, wherein environmental data detected by the sensor system is taken into consideration when actuating the drive device. For example, during a movement, obstacles or other laying units detected by the sensor system can be evaded. The running surface can be formed by the tool or connected to the tool or provided separately from the tool. Advantageously, despite a high level of flexibility, a high degree of automation is thus provided.

According to one embodiment, the laying units each comprise communication devices which are configured for communication between the laying units in order to determine the laying of the fiber arrangement, in particular the pattern or the distribution of the fiber arrangement. Advantageously, the laying units can thus interact with one another in a flexible and/or autonomous manner to lay the predetermined fiber arrangement together. For example, the communication devices can be devices for a data-transmitting radio link, for example a wireless network (WLAN) module for producing a network connection.

According to an advantageous embodiment, the shaping tool is in the form of a running surface. This is advantageous in particular in the case of components having large surface areas. In this case, the laying units can be moved directly on the tool in order to lay the fiber arrangement thereon.

According to another embodiment, a hollow body is provided as the running surface, the inner face of which forms the running surface. In this case, at least some portions of the tool can be arranged inside the hollow body in such a way that the fiber material can be wound or braided around the tool by laying units moving on the running surface. Thus, in this case, laying a predetermined fiber arrangement is provided as winding or braiding a predetermined fiber arrangement around the tool.

According to one advantageous embodiment, the running surface is designed to be ferromagnetic. In this case, the laying units each comprise a drive device having magnets which can be controlled by the control device in order to move on the running surface in a magnetically driven manner. A ferromagnetic design of the running surface is to be understood to mean that the running surface contains ferromagnetic material in an amount which is sufficient for moving the drive device. For this purpose, the running surface can, but does not have to, consist exclusively of ferromagnetic material. Particularly advantageously, shaping tools which are often produced by conventional AFP procedures can thus be used as the running surface according to the disclosure herein, since the tools are often produced from ferromagnetic materials or contain ferromagnetic materials. Also in the case of a hollow body providing the running surface, the body can be in the form of a ferromagnetic hollow body, for example an annular, hollow-cylindrical or differently shaped hollow body. Shapes of the hollow body which are tapered, closed, closed in part and/or separable are also conceivable.

According to another embodiment, the running surface contains controllable magnets. The controllable magnets are for example provided so as to be controllable by the control device of the laying units. In this case, the laying units comprise a drive device which interacts with the controllable magnets in order to move on the running surface in a magnetically driven manner. The drive device can likewise be designed in this case to provide a controllable or permanent magnetic field which interacts with the controllable magnets of the running surface and/or can have a ferromagnetic design.

According to an advantageous embodiment of the method for producing a fiber composite component, the laying units each move on an assigned running surface in order to lay the fiber material. In particular, the units move on the running surface in an autonomous manner. This can be carried out for example by detecting the environment by an integrated sensor system, controlling by an integrated control device, and driving by an integrated drive device. Advantageously, the laying units can thus be moved in an automated but still very flexible manner.

According to another embodiment of the method, the shaping tool is provided in the form of a running surface, the laying units moving in order to lay the fiber material on the shaping tool. Advantageously, it is therefore not necessary to provide an additional apparatus as the running surface.

According to another embodiment, the laying units move on an inner face of a hollow body, which inner face is in the form of a running surface, in order to lay the fiber material. In this case, the tool is arranged inside the hollow body in such a way that the laying units moving on the running surface wind or braid the fiber material around the tool. By winding or braiding around a tool, complex geometries can advantageously be reproduced. In this case, the tool can also be in the form of a core, optionally also in the form of a lost core. This is possible when there is both a high level of flexibility with regard to the manner in which the fiber is deposited, for example with a wide range of winding or braiding patterns, and in particular also with differently shaped and/or differently sized hollow bodies. Furthermore, the tool (or the core) can be guided through the hollow body during the laying process, in particular in a continuous manner. The hollow body can thus be designed with a relatively small depth, wherein very long fiber composite components can also still be produced.

According to some developments, the laying units move on the running surface in a magnetically driven manner in order to lay the fiber material. For this purpose, the laying units can be magnetically held on the running surface in a defined manner and/or moved along the running surface in a predetermined manner. Advantageously, magnetic or ferromagnetic properties of the running surface are therefore used to move the laying units. Furthermore, as a result of the fact that the laying units do not have to transmit any driving force to the running surface via frictional locking, in particular in the case of a tool which is in the form of a running surface, fibers which have already been laid are prevented from slipping out of position due to a driving force. Instead, the magnetically driven laying unit rolls over any fibers which have already been laid without a driving force being transmitted thereby via frictional locking.

According to one embodiment, the running surface is provided to have a ferromagnetic design. Furthermore, the laying units each comprise a drive device having controllable magnets in order to move on the running surface in a magnetically driven manner, wherein the magnets for moving the laying unit on the running surface are each actuated by the control device which belongs to each laying unit. Advantageously, in this case, existing ferromagnetic tools can also be used as the running surface. Alternatively or additionally, suitable running surfaces can be produced in a simple and economical manner.

According to another embodiment, the running surface contains controllable magnets. The laying units each comprise a drive device which interacts therewith in order to move on the running surface in a magnetically driven manner. The magnets are actuated by a control device in order to move the individual laying units on the running surface. For example, in this case, a movable mass of the drive device, for example a movable pendulum, is displaced, inside a housing of the laying unit, out of an idle position by magnetic attraction, so that the housing rolls or tilts according to the displacement. For example, the controllable magnets of the running surface are actuated accordingly at the point which is suitable for movement by the control device which belongs to each laying unit.

The configurations and developments above can be combined with one another as desired, where appropriate. In particular, all the features of the apparatus for producing a fiber composite component can be transferred to the method for producing the fiber composite component, and vice versa.

Further possible configurations, developments and implementations of the disclosure herein also comprise combinations, which are not explicitly mentioned, of features of the disclosure herein described previously or in the following with respect to the embodiments. In particular, in the process a person skilled in the art will also add individual aspects as improvements or additions to the respective basic forms of the present disclosure.

BRIEF DESCRIPTION OF THE DRAWINGS

The disclosure herein will be described in greater detail below on the basis of embodiments and with reference to the accompanying figures of the drawings. The elements of the drawings are not necessarily shown to scale with respect to one another.

In the drawings.

In the figures, the same reference numerals denote like or functionally like components, unless stated otherwise.

DETAILED DESCRIPTION

Figure 1:
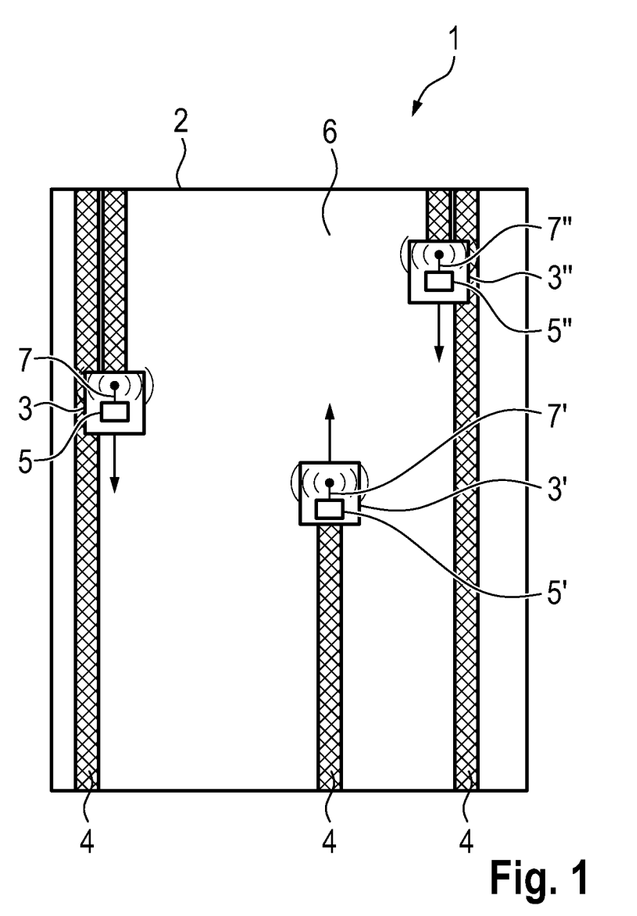
FIG. 1 is a schematic plan view of an apparatus for producing a fiber composite component.

FIG. 1 is a schematic plan view of an apparatus 1 for producing a fiber composite component.

The device 1 comprises a shaping tool 2 and a plurality of laying units 3, 3', 3". The tool 2 is in the form of a running surface 6 for the laying units 3, 3', 3".

The laying units 3, 3', 3" are each designed to lay a fiber material 4 on the shaping tool 2. The units each comprise a control device 5, 5', 5", which is configured to actuate the particular laying unit 3; 3'; 3" to automatically interact with the additional laying units 3, 3' 3" in order to lay a predetermined fiber arrangement together.

The laying units 3, 3', 3" are shown during the process of laying the fiber material 4, wherein three laying units 3, 3', 3" are shown purely by way of example. Rather than three, there can be any other number of laying units 3, 3', ( . . . ), 3".

The laying units 3, 3', 3" are each configured to move autonomously on the running surface 6. The units accordingly comprise sensors (not shown in detail) and a drive device, which interact with the control device 5, 5', 5" for autonomous movement. The sensors detect regions which have already been overlaid with fiber material 4, edge regions of the tool 2 and additional laying units. The laying units 3, 3', 3" each further comprise communication devices 7, 7', 7" which are provided for communication between the laying units 3, 3', 3". The pattern or the distribution of the fiber arrangement between the laying units 3, 3', 3" for laying the arrangement can thus be determined in a flexible manner.

A laying unit is continually actuated by the control device 5, 5'; 5" in such a way that the nearest portion of the tool 2, which is to be overlaid with a fiber layer of the fiber material 4, is overlaid in a manner that is geometrically simple to detect, in particular in a straight line.

Information about portions which have already been overlaid is distributed between the laying units by the communication devices 7, 7', 7". The movement paths of the laying units thus only cross if this is desirable for the pattern to be laid of the fiber arrangement, or if a depositing unit moves to a new starting point.

Upon reaching an edge or a boundary of the tool 2 or a portion which has already been overlaid with fiber material 4 in the desired manner, the movement direction of the laying unit 3; 3'; 3" is changed, which is actuated by the control device. For example, the depositing unit rotates with an offset of a width of a fiber layer or a laying web of the fiber material 4 and, during a movement in the opposite direction, lays an additional fiber layer adjacent to the previously laid laying web. If there are no free adjacent portions of the tool, the laying unit moves to a new starting point which has not yet been overlaid with a desired fiber layer. The starting point is for example selected on the basis of the information transmitted from the other laying units to be a point on the tool at which deposition has not yet taken place in the desired manner.

This procedure is continued in particular in an autonomous manner until there are no more free portions of the tool 2 at which the predetermined fiber arrangement plans for there to be a deposition. The entire shaping tool 2 is thus overlaid with fiber material 4.

In this case, the fiber material can be carried along by the laying units 3, 3', 3" in a supply portion or fed by an external feeding system.

Figure 2A:
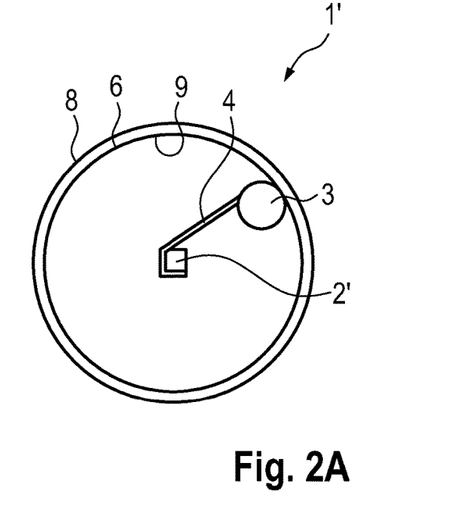
FIG. 2A is a schematic front view of an apparatus for producing a fiber composite component according to another embodiment.

FIG. 2A is a schematic front view of an apparatus 1' for producing a fiber composite component according to another embodiment.

In this embodiment, by contrast with FIG. 1, a hollow body 8 is provided as a running surface 6, the inner face 9 of which forms the running surface 6. In this case, the shaping tool 2' is at a distance from the running surface 6, and at least some portions of the tool are arranged inside the hollow body 8. The laying units 3, 3', 3" move on the running surface and thereby wind or braid around the tool 2', as a result of which fiber is deposited on the tool 2'.

Figure 2B:
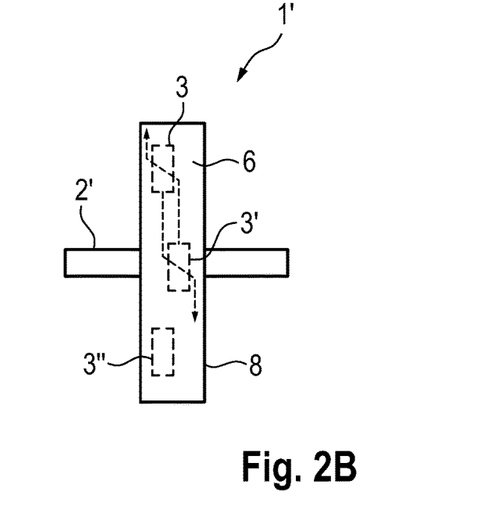
FIG. 2B is a schematic side view of an apparatus for producing a fiber composite component according to another embodiment.

FIG. 2B is a schematic side view of an apparatus for producing a fiber composite component according to another embodiment.

An example of a movement path of the laying units 3, 3', 3" is indicated by dashed arrows.

The braiding or winding around the tool 2' is carried out in a predetermined manner. For example, the paths of the movement of the laying units 3, 3', 3" can cross regularly in a maypole-dance type pattern when encircling the tool 2', so that the fiber material 4 is braided on the tool 2' in a typical pattern. Other, in particular more complex braiding patterns can also be produced in the case of a correspondingly adapted movement.

In the embodiment shown, the tool, which has a length which is greater than the depth of the hollow body 8 and the width of the running surface 6, is guided through the hollow body 8 during the braiding process. The tool is guided through in particular in a continuous manner.

Figure 3A:
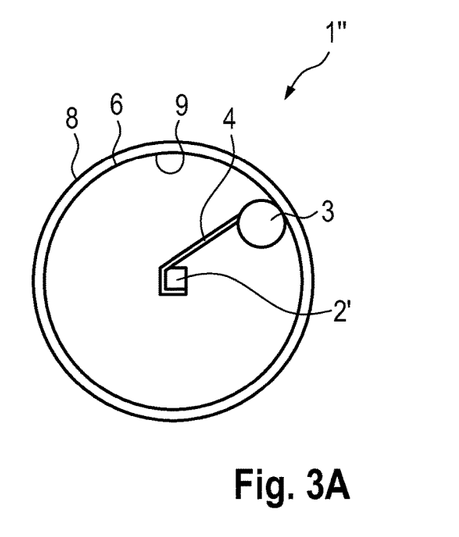
FIG. 3A, 3B show the apparatus for producing a fiber composite component having a first modification.
Figure 3B:
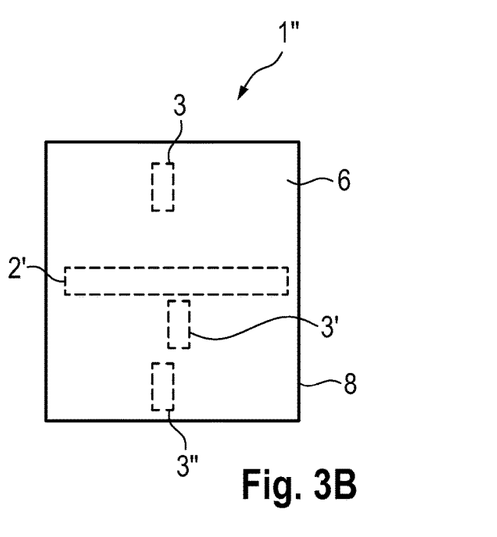

FIG. 3A, 3B show the apparatus for producing a fiber composite component having a first modification.

By contrast with the embodiment according to FIGS. 2A and 2B, the running surface 6 in this case has a width, and the hollow body has a depth, which is formed so as to be greater than the length of the tool 2'. In this case, the tool 2' can therefore be arranged in a stationary manner inside the hollow body, wherein the laying units 3, 3', 3" also move axially along the hollow body and can thus wind or braid around the tool 2' completely.

Figure 4A:
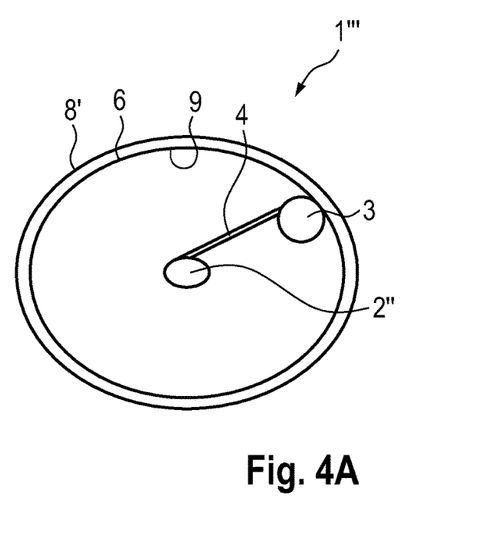
FIG. 4A, 4B show the apparatus according to FIG. 3A, 3B having another modification.
Figure 4B:
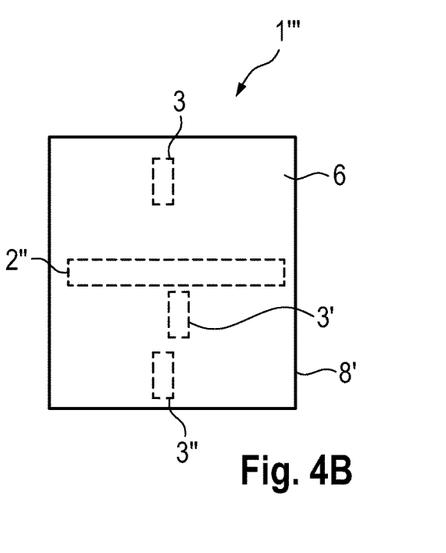

FIG. 4A, 4B show the apparatus according to FIG. 3A, 3B having another modification.

In the case of this modification, a more complex shape of a tool 2" is shown by way of example. The hollow body 8' has a shape which matches the shape of the tool 2". Changing distances of the tool 2" from a center axis are likewise changed on the hollow body 8 and thus compensated for. The embodiment which is shown purely by way of example relates to a shape of the tool 2" and of the hollow body 8 having an elliptical cross section.

Instead of or in addition to an elliptical shape, any other types of complex shapes are also conceivable. For example, the tool 2" and accordingly also the hollow body 8' could taper in the longitudinal direction thereof, in particular could have a dome-shaped design. Furthermore, the tool 2" and the hollow body 8' could also follow a different shape which changes in the transverse and vertical directions.

Figure 5:
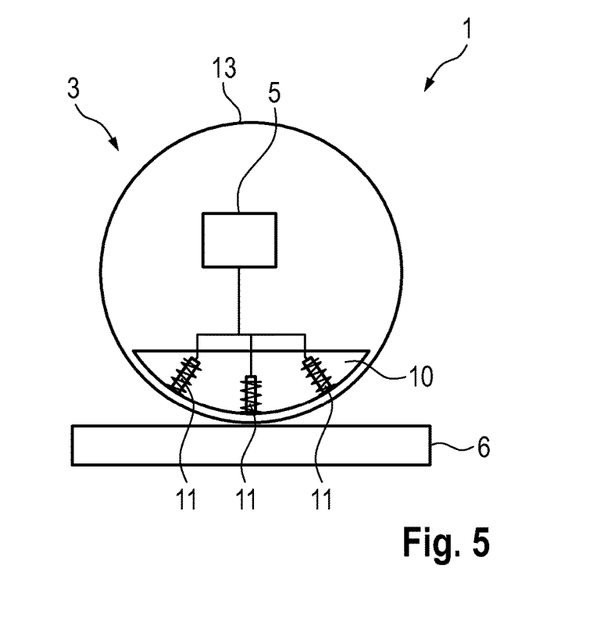
FIG. 5 is a schematic sectional view of an embodiment of an apparatus for producing a fiber composite component.

FIG. 5 is a schematic sectional view of an embodiment of an apparatus 1 for producing a fiber composite component. In this case, the apparatus can be an apparatus 1; 1'; 1"; 1'" which is configured according to any of FIGS. 1 to 4B.

In this embodiment, the running surface 6 is designed to be ferromagnetic. The laying unit 3 comprises a spherical housing 13. As an alternative to a spherical housing, the housing can also be in the form of a cylindrical, in particular circular cylindrical housing.

Inside the housing 13, a drive device 10 which movably runs along the inner wall of the housing 13 is provided. The drive device 10 is in the form of a pendulum in the shape of a spherical segment, which pendulum moves in the peripheral direction of the housing 13, and comprises actuable magnets 11 which act in different radial directions. In the case of a circular cylindrical housing, the pendulum is accordingly in the shape of a cylinder segment.

If the drive device 10 is displaced with respect to the orientation thereof relative to the housing 13 by an interaction of the magnets 11 with the ferromagnetic running surface 6, this also makes the housing 13 follow or roll in the direction of the drive device.

The magnets 11 are correspondingly actuated by the control device 5 to move the reading unit 3.

As an alternative to a freely movable pendulum, guiding devices, for example a rail system or the like, can also be provided on the inner face of the housing 13 to guide the drive device 10.

Figure 6:
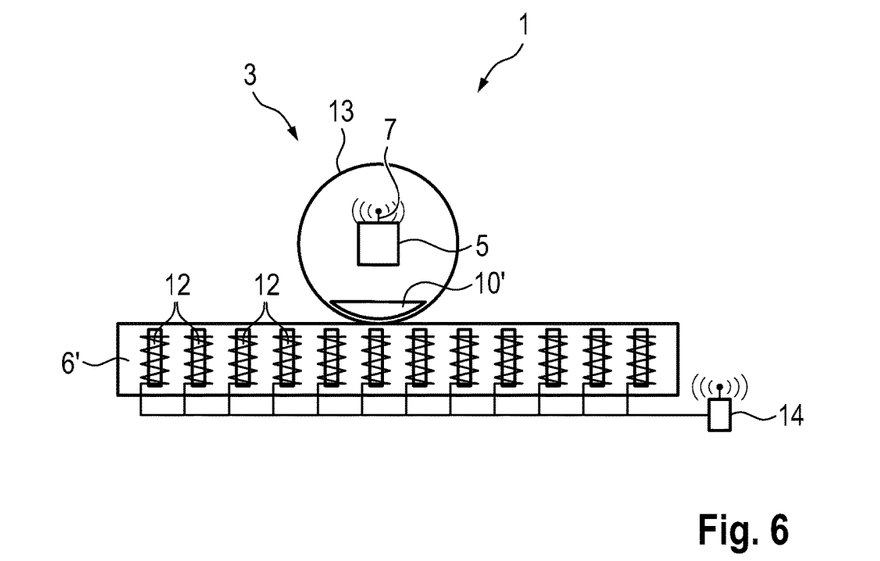
FIG. 6 is a schematic sectional view of another embodiment of an apparatus for producing a fiber composite component.

FIG. 6 is a schematic sectional view of another embodiment of an apparatus for producing a fiber composite component. In this case, the apparatus can likewise be an apparatus 1; 1'; 1"; 1'" which is configured according to any of FIGS. 1 to 4B.

In this embodiment, the running surface 6' comprises a plurality of controllable magnets 12. The laying unit 3 comprises a drive device 10' which interacts therewith and is likewise provided, by way of example, as a pendulum which can be moved freely along the inner face of the housing. In this case, the pendulum is a ferromagnetic pendulum.

The controllable magnets 12 are coupled to a receiving device 14, which is configured to relay control commands from the control device 5 of the laying unit 3 to the individual magnets 12. The control device 5 is coupled to communication device 7 of the laying unit 3 so that control signals can be transmitted to the receiving device 14.

The control device 5 is thus capable of actuating the controllable magnets 12 individually in a way which is suitable for movement and thereby generating a magnetic field to attract the drive device 10'. If the drive device 10' is for example attracted by a magnet 12 which is arranged at the side thereof, the device is deflected out of an idle position relative to the housing 13 of the laying unit 3. The housing 13 and, together therewith, the entire laying unit, are thus also made to follow or roll in the direction of the magnet 12 currently generating the magnetic field.

The magnets 12 are correspondingly actuated by the control device 5 to move the laying unit 3.

Although the present disclosure has been described on the basis of some embodiments here, it is not restricted to the embodiments, but can be modified in various ways.

For example, the drive device is not necessarily a pendulum. Alternatively or in addition to a pendulum, controllable magnets can also be provided which are movable on a guide system provided inside the laying unit.

According to another embodiment, a layer of the laying unit which is integrated in an outer skin of the housing 13 or a layer of the laying unit which is provided close to an outer skin of the housing 13 can be designed to be able to be magnetised by actuation. In particular, actuable electromagnets can be provided to be integrated in the outer skin of the laying unit. In order to move the laying unit, the magnetic field is displaced by a corresponding actuation in the desired direction of travel along the outer skin or magnetisable layer.

In addition to a controllable magnetic field, a permanently acting or static magnetic field can also be provided between the laying unit 3 and the running surface 6. The laying unit 3 can thus be held on the running surface 6 regardless of the movement, for example it can operate even when overhead. Furthermore, a compacting force applied to the fiber material 4 by the laying unit 3 can thus also be set to a predetermined value.

According to one embodiment of the laying unit 3, a supply portion is provided to provide a supply of fiber material, which portion is formed with the housing 13. In particular, the supply portion can be configured to provide a supply of fiber material in the form of a fiber coil. The laying unit 3 can thus advantageously transport the fiber material for deposition in a predetermined location, which material therefore does not need to be fed from outside.

According to another embodiment, the fiber material is fed from the outside via a feeding device, wherein the laying unit 3 lays the fiber material in the predetermined location. In this embodiment as well, a housing 13 can be provided to receive the other components of the laying unit.

In one embodiment, a retaining device is provided which mounts the components of the laying unit inside the housing. The retaining device retains or mounts the components and continually orients the components according to requirements. The retaining device itself can be provided to be mounted in a fixed or movable manner inside the housing 13. The retaining device can further be formed integrally with the drive device 10; 10'. In a movable retaining device, the position of the components is corrected in such a way that the components are always oriented in a desired direction in accordance with the movement of the laying unit. For example, an inner housing with a slightly smaller diameter can be provided for this purpose inside the housing, which inner housing can be rotated relative to the housing 13. For example, for this purpose, the inner housing can be coupled to the housing 13 by mechanical or magnetic bearings. Such a configuration is considered in particular in the case of a spherical or cylindrical housing 13.

The housing 13 does not necessarily have to be used as a rolling surface. According to another embodiment, the drive device is in the form of a drive roll which is coupled to the housing. Advantageously, this represents a drive device which is relatively simple to produce, which is not provided to be integrated in the housing, but rather to merely be coupled thereto. Moreover, a drive roll of this type can also provide stability of the laying unit while standing or while moving.

According to one development, the drive device 10; 10' is in the form of a laying device for laying the fiber material on a tool 2 in a defined manner. Advantageously, the drive device 10; 10' thus takes over a plurality of functions including transmitting force to the running surface 6; 6' and laying in a defined manner and/or compacting the fiber material. The laying device can also be used to compact fiber material which has already been laid. The forces applicable by the laying device in order to lay in a defined manner and/or compact the material can be regulated or set by the strength of the magnetic field which is provided to move and/or hold the laying unit 3 on the running surface 6.

The drive device does not exclusively have to be a magnetic drive. Other types of drives would also be conceivable instead.

Furthermore, instead of rolling laying units, flying or floating laying units are also conceivable. This would be advantageous in particular in a zero-gravity environment or in zero gravity. The laying units are then driven for example by jet nozzles. In particular, the laying units can thus circle around the shaping tool. Together with the drive by the jet nozzles, centripetal forces can in particular also be provided in the process for the circling motion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a fiber composite component comprising:
providing a shaping tool and a plurality of laying units which are mechanically independent of one another and are configured to lay a fiber material on the shaping tool; and
laying the fiber material on the shaping tool together by the plurality of laying units in a predetermined fiber arrangement,
wherein the laying units each comprise a control device, by which each laying unit is actuated in order to automatically interact with at least one other laying unit to lay the predetermined fiber arrangement together,
wherein the laying units move autonomously on an assigned running surface to lay the fiber material, and
wherein the laying units move on the running surface in a magnetically driven manner to lay the fiber material.

2. The method of claim 1, wherein the laying units comprise communication devices and communicate with one another in order to determine laying of the fiber arrangement, including a pattern or a distribution of the fiber arrangement.

3. The method of claim 1, wherein the shaping tool is provided as the running surface, the laying units moving in order to lay the fiber material on the shaping tool.

4. The method of claim 1, wherein the running surface comprises a ferromagnetic design, and the laying units each comprise a drive device having controllable magnets in order to move on the running surface in the magnetically driven manner, the magnets each being actuated by the control device which belongs to each laying unit in order to move the laying units on the running surface.

5. The method of claim 1, wherein the running surface contains controllable magnets, and the laying units each comprise a drive device interacting therewith in order to move on the running surface in the magnetically driven manner, the magnets being actuated by the control devices in order to move the laying units on the running surface.

6. The method of claim 1, wherein the laying units move on an inner face of a hollow body, which face forms the running surface, in order to lay the fiber material, the shaping tool being arranged inside the hollow body such that the laying units moving on the running surface wind or braid the fiber material around the shaping tool.

7. The method of claim 1, wherein the method is for producing a fiber composite component by an apparatus for producing a fiber composite component, the apparatus comprising a shaping tool and a plurality of laying units which are mechanically independent of one another and are each configured to lay a fiber material on the shaping tool, wherein the laying units each comprise a control device which is configured to control each laying unit to automatically interact with at least one other laying unit in order to lay a predetermined fiber arrangement together.

8. A system for producing a fiber composite component, comprising:
a shaping tool; and
a plurality of laying units which are mechanically independent of one another and are each configured to lay a fiber material on the shaping tool, the laying units each comprising a control device that is configured to control each laying unit to automatically interact with at least one other laying unit in order to lay a predetermined fiber arrangement together,
wherein the laying units are each configured to autonomously move on an assigned running surface, and
wherein the running surface is ferromagnetic, and the laying units each comprise a drive device having magnets which are controllable by the control device to move on the running surface in a magnetically driven manner, or wherein the running surface contains controllable magnets, including magnets that are controllable by the control device of a laying unit, and the laying unit comprises a drive device for interacting therewith to move on the running surface in a magnetically driven manner.

9. The system of claim 8, wherein the laying units comprise communication devices which are configured for communication between the laying units in order to determine laying of the fiber arrangement, including a pattern or a distribution of the fiber arrangement.

10. The system of claim 8, wherein the shaping tool is provided as the running surface.

11. The system of claim 8, wherein a hollow body is provided, an inner face of which forms the running surface, at least portions of the shaping tool being arrangeable inside the hollow body such that the fiber material can be wound or braided around the shaping tool by laying units moving on the running surface.

* * * * *